(12) United States Patent
Haines et al.

(10) Patent No.: US 8,364,929 B2
(45) Date of Patent: Jan. 29, 2013

(54) ENABLING SPANNING FOR A STORAGE DEVICE

(75) Inventors: Jonathan W. Haines, Boulder, CO (US); Wayne H. Vinson, Longmont, CO (US); Timothy R. Feldman, Lousville, CO (US)

(73) Assignee: Seagate Technology LLC, Cupertino, CA (US)

( * ) Notice: Subject to any disclaimer, the term of this patent is extended or adjusted under 35 U.S.C. 154(b) by 686 days.

(21) Appl. No.: 12/604,842

(22) Filed: Oct. 23, 2009

(65) Prior Publication Data

US 2011/0099321 A1    Apr. 28, 2011

(51) Int. Cl.
G06F 12/00 (2006.01)
G06F 13/00 (2006.01)
G06F 13/28 (2006.01)

(52) U.S. Cl. .......................... 711/171; 711/103; 711/209

(58) Field of Classification Search .................. 711/170, 711/171
See application file for complete search history.

(56) References Cited

U.S. PATENT DOCUMENTS

| | | | |
|---|---|---|---|
| 5,630,093 A | 5/1997 | Holzhammer et al. | |
| 5,905,993 A | 5/1999 | Shinohara | |
| 6,018,778 A | 1/2000 | Stolowitz | |
| 6,441,427 B1 | 8/2002 | Yamada et al. | |
| 6,934,804 B2 | 8/2005 | Hashemi | |
| 7,073,010 B2 | 7/2006 | Chen | |
| 7,493,450 B2 * | 2/2009 | Bearden | 711/137 |
| 7,529,905 B2 | 5/2009 | Sinclair | |
| 2004/0210708 A1 * | 10/2004 | Conley | 711/103 |
| 2006/0005069 A1 | 1/2006 | Gaertner | |
| 2007/0186032 A1 | 8/2007 | Sinclair et al. | |
| 2008/0037321 A1 * | 2/2008 | Luo et al. | 365/185.03 |
| 2008/0155227 A1 | 6/2008 | Sinclair et al. | |
| 2008/0168069 A1 | 7/2008 | Chang et al. | |
| 2008/0228992 A1 | 9/2008 | Dumitru et al. | |
| 2011/0099350 A1 | 4/2011 | Feldman et al. | |
| 2011/0219178 A1 * | 9/2011 | Eggleston et al. | 711/103 |

OTHER PUBLICATIONS

Kjelsø et al., Memory Management in Flash-Memory Disks with Data Compression, Springer-Verlag, 1995, 16 pages.
Oct. 30, 2012, File history for U.S. Appl. No. 12/604,889, 186 pages.

* cited by examiner

*Primary Examiner* — Jared Rutz
*Assistant Examiner* — Prasith Thammavong
(74) *Attorney, Agent, or Firm* — Hollingsworth Davis, LLC (57) ABSTRACT

A storage device, e.g., an SSD, is configured to enable spanning for a logical block between pages of the device. In one example, a device includes a data storage module to receive data to be stored, wherein the data comprises a plurality of logical blocks, and wherein a size of the plurality of logical blocks exceeds a size of a first page of the device, and a spanning determination module to determine whether to partition one of the plurality of logical blocks into a first partition and a second partition, wherein the data storage module is configured to partition the one of the plurality of logical blocks into the first partition and the second partition and to store the first partition in the first page and the second partition in a second, different page when the spanning determination module determines to partition the one of the plurality of logical blocks.

27 Claims, 6 Drawing Sheets

ENABLING SPANNING FOR A STORAGE DEVICE

BACKGROUND

Computers and other electronic devices generally require a medium in which digital data can be stored and retrieved. Data storage devices come in a variety of forms and serve a variety of purposes. These devices can be broken down into two general categories: solid state and non-solid state storage devices.

Non-solid state devices are devices that contain moving parts. Some typical non-solid state storage devices are hard disk drives, CD/RW drives and disks, DVD/R/RW drives and disks, floppy disks, tape drives and probe memory devices. These storage devices move one or more media surfaces and/or the associated data head relative to one another to position the data head relative to a desired location or area on the media. The data is then written to or read from this data location. In disk drives for example, data is stored on a disk that rotates at an essentially constant velocity. By moving the head over the rotating disk, all memory locations or sectors of the disk can be accessed.

Solid state storage devices differ from non-solid state devices in that they typically have no moving parts. Solid state storage devices may be used for primary storage of data for a computing device, such as a personal computer, workstation computer, or server computer. Another example of a solid state storage device is flash memory, such as used in a Compact Flash Memory Card. Compact Flash Memory Cards are used primarily for easy and fast information storage in such devices as digital cameras, home video game consoles and personal digital assistants.

Conventional solid state storage devices store logical block address (LBA) blocks in pages of an erasure block. When a page is to be updated, the page must be invalidated and entirely rewritten, including both unaltered and altered (e.g., new or modified) data.

SUMMARY

In one example, a method includes receiving, by a storage device, data to store in the storage device, the data comprising a plurality of logical blocks at least one of which does not match a corresponding physical block size of the storage device, determining that a size of the plurality of logical blocks exceeds a size of a first page of an erasure block of the storage device, determining whether to span at least one of the plurality of logical blocks across the first page and a second, different page of the storage device, responsive to determining to span the at least one of the plurality of logical blocks, partitioning the one of the plurality of logical blocks into a first partition and a second partition, and storing the first partition in the first page and the second partition in the second, page, and responsive to determining not to span the at least one of the plurality of logical blocks, storing the at least one of the plurality of logical blocks in a page of the storage device other than the first page.

In another example, storage device includes a flash die comprising an erasure block, wherein the erasure block comprises a first page to store logical blocks of data, a data storage module to receive data to be stored, wherein the data comprises a plurality of logical blocks, wherein at least one of the plurality of logical blocks does not match a size of a corresponding physical block of the storage device, and wherein a size of the plurality of logical blocks exceeds a size of the first page, and a spanning determination module to determine whether to partition one of the plurality of logical blocks into a first partition and a second partition. The data storage module is configured to partition the one of the plurality of logical blocks into the first partition and the second partition and to store the first partition in the first page and the second partition in a second, different page when the spanning determination module determines to partition the one of the plurality of logical blocks.

In another example, a system includes a storage device comprising a flash die, wherein the flash die comprises an erasure block, wherein the erasure block comprises a first page to store logical blocks of data, and a computing device coupled to the storage device, the computing device comprising a computer-readable medium to store instructions for a data storage module and a spanning determination module, and a control unit to execute the data storage module and the spanning determination module, wherein the control unit executes the data storage module to receive data to be stored to the storage device, wherein the data comprises a plurality of logical blocks, wherein at least one of the plurality of logical blocks does not match a size of a corresponding physical block of the storage device, and wherein a size of the plurality of logical blocks exceeds a size of the first page, wherein the control unit executes the spanning determination module to determine whether to partition one of the plurality of logical blocks into a first partition and a second partition, and wherein the control unit executes the data storage module to partition the one of the plurality of logical blocks into the first partition and the second partition and to store the first partition in the first page and the second partition in a second, different page when the spanning determination module determines to partition the one of the plurality of logical blocks.

In another example, a computer-readable medium, such as a computer-readable storage medium, contains, e.g., is encoded with, instructions that cause a programmable processor to receive data to store in a storage device, wherein the data comprises a plurality of logical blocks, wherein at least one of the plurality of logical blocks does not match a size of a corresponding physical block of the storage device, and wherein a size of the plurality of logical blocks exceeds a size of a first page of an erasure block of the storage device, determine to partition one of the plurality of logical blocks into a first partition and a second partition, partition the one of the plurality of logical blocks into the first partition and the second partition, and store the first partition in the first page and the second partition in a second, different page of the storage device.

The details of one or more examples are set forth in the accompanying drawings and the description below. Other features, objects, and advantages will be apparent from the description and drawings, and from the claims.

DETAILED DESCRIPTION

In general, this disclosure describes techniques for enabling spanning between pages of a storage device, e.g., a solid state drive. Spanning generally refers to writing different portions of data of one logical block, also referred to as a logical block address (LBA) block or simply an LBA, to two different pages. For example, there may not be sufficient space at the end of a first page to store all of the data of one LBA. This may occur when there are not a fixed number of logical blocks per page, for example, when data of blocks is compressed to various degrees on each page or when at least one LBA stored on the page otherwise does not match the size of a physical block of the page. The techniques of this disclosure enable spanning by determining whether to write the one LBA entirely to a different page, or to write a first portion of the LBA to the current page and writing the remaining portion of the LBA to a different page.

Various factors may influence the decision to partition data of one logical block among two pages. For example, sequentiality of blocks in a page, current over-provisioning of the system, efficiency of storage in a page, current power consumption (e.g., relative to maximum peak power), comparison of proximity of blocks if spanning is applied, current packing efficiency of in-use physical blocks (e.g., level of currently used pages relative to number of total pages), or number of rated erasure cycles compared with actual erasure cycles, may each influence the determination of whether or not to utilize spanning (which may also referred to herein as spanning or bridging). A controller of a solid state drive (SSD) may use any or all of these example factors when determining whether to utilize spanning for a particular logical block when storing the logical block in the SSD.

Figure 1:
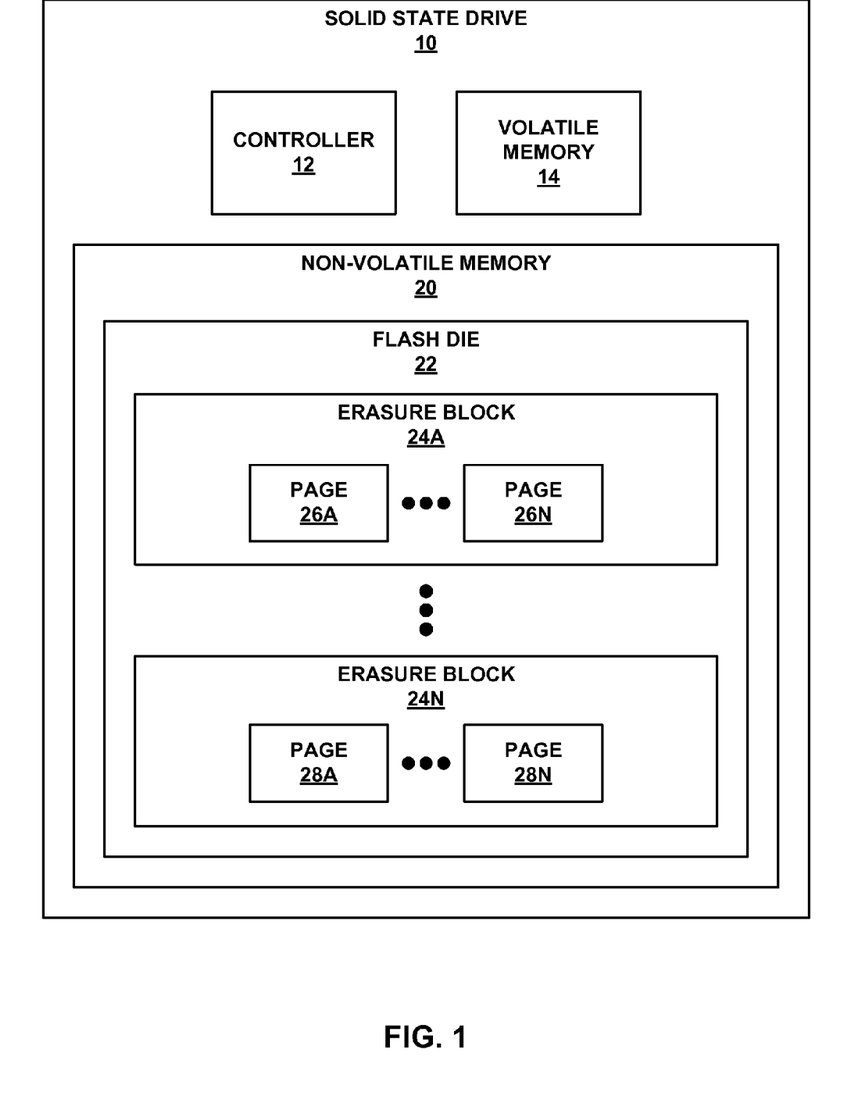
FIG. 1 is a block diagram illustrating an example solid state drive (SSD).

FIG. 1 is a block diagram illustrating an example solid state drive (SSD) 10. In the example of FIG. 1, SSD 10 includes controller 12, volatile memory 14, and non-volatile memory 20. Volatile memory 14 may correspond to random access memory (RAM). Non-volatile memory 20 corresponds to long-term storage of SSD 10. In general, SSD 10 includes one or more flash dies, such as flash die 22, each of which include a plurality of erasure blocks 24A-24N (hereinafter referred to as erasure blocks 24). Flash die 22 may generally comprise one or more semiconductor chips. Each of erasure blocks 24 includes a plurality of pages. In the example of FIG. 1, erasure block 24A includes pages 26A-26N (hereinafter pages 26) and erasure block 24N includes pages 28A-28N (hereinafter pages 28). It should be understood that the letter N in the reference numerals above is a non-negative integer and that the use of N with respect to different reference numbers should not be understood as implying that the number of items are equal. For example, the number of pages 26 is not necessarily equal to the number of pages 28. Likewise, the number of erasure blocks 24 is not necessarily equal to the number of pages 26 or the number of pages 28.

In the example of FIG. 1, SSD 10 includes controller 12. Controller 12 comprises hardware, such as one or more processors, microprocessors, digital signal processor (DSPs), application specific integrated circuits (ASICs), field programmable gate arrays (FPGAs), or any other equivalent integrated or discrete logic circuitry for performing the functions ascribed to controller 12. In other examples, a computing device (not shown) coupled to SSD 10 may implement the functionality ascribed to controller 12. For example, an SSD may not include controller 12, and instead a software driver implemented by an operating system of the computing device may perform the functions of controller 12. In this manner, a processor or other control unit separate from SSD 10 may control SSD 10.

In general, SSD 10 stores data for a long-term period in a page, such as page 26A of erasure block 24A. Data is stored using logical block address (LBA) blocks, also referred to simply as LBAs. Controller 12 also writes data regarding each page to a page header in the page. The page header generally includes metadata that describes data of the corresponding page. The page header may include data such as a number of LBAs stored in the corresponding page and a size or length of the page header. In accordance with the techniques of this disclosure, controller 12 stores a plurality of LBAs in each of pages 26, 28. Controller 12 may store different numbers of LBAs in each page of an erasure block. Different numbers of LBAs may result from the size of an LBA not matching a physical block of the page. This mismatch may arise for a variety of reasons, for example, compression of an LBA, transforming an LBA by adding an error correction code (ECC) or other metadata to the LBA, various host storage schemes that result in different-sized LBAs, and different-sized page headers. In particular, each LBA may be a different size than other LBAs, or at least one of the LBAs in a page may not match the size of a physical block in the page. In some cases, compressing LBAs may result in less than a full LBA being capable of being stored at the end of a page, such as page 26A.

In general, the techniques of this disclosure relate to determining whether to perform spanning with respect to a last LBA of a plurality of LBAs to be written in a particular page. Spanning generally results in an LBA that spans two pages, wherein a first portion of the LBA is stored in one page and a second portion of the LBA is stored in another page. However, in some situations, an LBA may span more than two pages, e.g., three or more pages. This may occur when a host utilizes a storage scheme that results in LBAs that are larger than one page of an SSD. As another example, an LBA may span three or more pages when the LBA is written to empty portions at the ends of three or more pages. Each of the three or more pages may additionally include data other than the spanned LBA, and the LBA may be written such that portions of the LBA occupy otherwise unused spaces on the respective pages. In some examples, controller 12 will always span, if spanning is possible, and the decision amounts to whether spanning is possible. In other examples, controller 12 analyzes one or more of the factors described in this disclosure to determine whether to perform spanning, and when the analysis indicates that spanning should be performed, controller 12 determines to perform spanning.

Before writing data to a page, such as page 26A, controller 12 writes the data to volatile memory 14. Controller 12 accumulates a full page of data in volatile memory 14 before writing the page to non-volatile memory 20, e.g., in page 26A. As controller 12 receives LBAs to be stored from a host (e.g., a computing device coupled to SSD 10), controller 12 writes the received LBAs to volatile memory 14. In some examples, controller 12 also compresses the data in volatile memory 14. This may cause a number N of LBAs that can be completely written to a page, such as page 26A, and an N+1$^{st}$ page that will not completely fit on the page.

In accordance with the techniques of this disclosure, when less than a full LBA is capable of being written to page 26A (e.g., because at least one LBA written to page 26A does not match the size of the physical blocks of page 26A), controller 12 determines whether to write a first portion of an LBA to page 26A and a remaining portion of the LBA to a different page, such as page 26B. Various factors may influence this determination, as described in greater detail below. Controller 12 may write the remaining portion of the LBA to a next page (e.g., page 26B), a different page of erasure block 24 that is not the next page (e.g., page 26N), a page of a different erasure block than erasure block 24A (e.g., page 28A of erasure block 24N), or even a page of a different flash die than flash die 22 in non-volatile memory 20. Controller 12 may identify the location (e.g., page) in which to write the remaining portion of the LBA, also referred to as "spanning data," write the current page created in volatile memory 14 to page 26A, and begin assembling a new page including the spanning data in volatile memory 14.

In this manner, SSD 10 may implement a method including receiving data to store in SSD 10, wherein the data comprises a plurality of logical blocks, wherein at least one of the plurality of logical blocks does not match a size of a corresponding physical block of the solid state drive, and wherein a size of the plurality of logical blocks exceeds a size of page 26A of erasure block 24A of SSD 10, determining to partition one of the plurality of logical blocks into a first partition and a second partition, partitioning the one of the plurality of logical blocks into the first partition and the second partition, and storing the first partition in page 26A and the second partition in a second, different page of SSD 10.

To keep track of where the remaining portion of the LBA is written, controller 12 may write a spanning locator or spanning identifier to the page header. In some examples, controller 12 may write the remaining portion of the LBA to a next page in erasure block 24A following page 26A, e.g., page 26B. In other examples, controller 12 may write the remaining portion of the LBA to a different page that is not the next page (e.g., page 26N) on erasure block 24A, a different one of erasure blocks 24, or even a different flash die. Accordingly, controller 12 may use a variable length code as the spanning locator.

For example, controller 12 may use a one-bit code "0" to indicate that there is no spanning, a two-bit code "10" to indicate that spanning occurs on the page immediately following page 26A of erasure block 24A, and a two-bit code "11" to indicate that spanning occurs to a page other than the page immediately following page 26A, plus an explicit page identifier that identifies the page, erasure block, and/or flash die at which the remaining portion of the LBA is written. In this manner, controller 12 may use a variable length code (VLC) to indicate the location of spanning data, such as a single bit to indicate that there is no spanning, two bits to indicate (i) that spanning occurs and (ii) that the page following page 26A is the page in which the spanning data is written, and a variable number of bits (greater than two) to explicitly define a location of the spanning data.

Controller 12 may evaluate one or more factors to determine whether to write less than a full LBA to a page when a full LBA will not fit at the end of the page. In one example, controller 12 is configured with a number of bytes X that must be written to each page, and when less than X bytes are currently provisioned for a page, but less than a full LBA will fit on the page, controller 12 may elect to use spanning to meet the X-bytes requirement and write the remaining portion of the LBA to a different page. In another example, controller 12 may evaluate one or more factors that influence the decision of whether to utilize spanning The factors may include, for example, sequentiality of blocks in a page, likelihood of reading two LBAs in close temporal proximity, current over-provisioning of the system, efficiency of storage in a page or efficiency of storage in SSD 10, current power consumption (e.g., relative to maximum peak power), comparison of proximity of blocks if spanning is applied, current packing efficiency of in-use physical blocks (e.g., level of currently used pages relative to number of total pages), or number of rated erasure cycles compared with actual erasure cycles.

Over-provisioning generally refers to utilization of a difference between physical capability of storage of a solid state drive and the host capacity of the solid state drive. That is, solid state drives are typically physically capable of storing more than the "host capacity," or the amount of data that a host computing device is permitted to store in the solid state drive. Solid state drives use this extra capacity to shift data among erasure blocks to avoid constantly erasing the erasure blocks, e.g., to avoid excessive wear on a subset of the erasure blocks. When a physical region of a solid state drive is determined to have gone bad, the region may be removed from the over-provisioning capacity. The over-provisioning capacity of a solid state drive may be expressed as a raw capacity value (e.g., one gigabyte or one gibabyte) or as a percentage of the host capacity (e.g., 10% of host capacity or 50% of host capacity).

When a solid state drive is relatively more over-provisioned, controller 12 may be less likely to utilize spanning for an LBA that will not completely fit on page 26A. On the other hand, when a solid state drive is relatively more over-provisioned, controller 12 may be less likely to utilize spanning for an LBA that will not completely fit on page 26A. To determine how over-provisioning impacts the spanning decision, controller 12 may calculate an over-provisioning value and compare the over-provisioning value to an over-provisioning threshold. Controller 12 may calculate the over-provisioning value as a percentage of the over-provisioning capacity that is being used. For example, controller 12 may calculate:

$$\text{Over-provisioning value} = \frac{(\text{physical\_capacity} - \text{host\_capacity})}{\text{host\_capacity}}$$

After calculating the over-provisioning value, controller 12 may compare the over-provisioning value to an over-provisioning threshold and use this comparison as a factor in determining whether to utilize spanning.

In some examples, controller 12 calculates an effective over-provisioning value. Some hosts use only a certain percentage of the host capacity, e.g., 50% of host capacity, without exceeding or expecting to exceed this utilization. Controller 12 may measure typical usage by a host. After an analysis period, controller 12 may determine that the controller is able to use space that is actually allocated to the host (i.e., host capacity) for over-provisioning. Treatment of this space in this manner by controller 12 is referred to as effective over-provisioning. Controller 12 may use measures for effective over-provisioning as a factor in the analysis as to whether to perform spanning or not similar to the manner in which general over-provisioning is used as a factor in this decision.

Another factor that influences the decision as to whether or not to perform spanning for an LBA is whether the LBA is sequential with other LBAs that have been written to page 26A, or that are to be written after the LBA. When the LBA is sequential, controller 12 may be more likely to utilize spanning for an LBA that will not completely fit in page 26A. Conversely, when the LBA is not sequential, controller 12 may be less likely to utilize spanning for the LBA. In this manner, spanning will most likely result in a storage scheme that will likely be beneficial when the LBA is read, because it will be likely that all of the LBAs in the sequence will be read.

Accordingly, the trade-off in processing to reassemble a bifurcated LBA will be made up in that the two pages storing the two portions of the spanned LBA would have been read together even without spanning, but the storage without spanning would be less efficient.

Controller 12 may be configured to calculate a sequentiality value. For example, controller 12 may determine a number of LBAs that are in sequence before and/or after the LBA for which the decision to span is being made. To determine the sequentiality value, controller 12 may determine whether a sequence identifier (sequence ID) of a block for which a decision as to whether or not to utilize spanning is in sequence with one or more sequence IDs of previous and/or subsequent blocks. That is, controller 12 may determine whether the sequence ID of a block for which a spanning decision is being made is in sequence with a sequence ID of an immediately previous block, or in sequence with a plurality of previous blocks. When sequence IDs are in sequence, controller 12 may be more likely to perform spanning for a block, but controller 12 may be less likely to perform spanning when the sequence ID is not in sequence with previous and/or subsequent block sequence IDs.

Controller 12 may further be configured with a sequentiality threshold. In some examples, when controller 12 determines that the sequentiality value exceeds the sequentiality threshold, controller 12 determines that spanning should not be performed, but when the sequentiality value does not exceed the sequentiality threshold, spanning should be performed. In some examples, controller 12 may use the determination of whether the sequentiality value exceeds the sequentiality threshold as one factor in a multi-factor analysis, e.g., in combination with any or all of the other factors discussed herein.

Controller 12 may also analyze compressibility of received data to determine whether to utilize spanning, e.g., as another factor in the analysis. The degree to which data is entropic is generally inversely proportional to the compressibility of the data. That is, lower-entropy data is more compressible, while higher-entropy data is less compressible. Controller 12 may determine the degree to which data to be written to page 26A is compressible, e.g., by compressing the data and determining how much compression was achieved. When the data is more compressible, controller 12 may be less likely to utilize spanning, because the compression will serve the purpose of spanning, namely the goal of packing data efficiently. On the other hand, when the data is less compressible, controller 12 may be more likely to utilize spanning, in order to more efficiently store the data. In some examples, controller 12 may compare the degree of compression achieved to a compression threshold to determine whether the compressibility of the data weighs in favor of spanning.

Controller 12 may also determine the current over-provisioning of SSD 10 to determine whether to utilize spanning. In general, over-provisioning refers to the difference between the amount of data made available to the host (or a user thereof) and the actual amount of data that can be stored on SSD 10. That is, SSD 10 may, in some examples, be capable of storing a greater amount of data than advertised to a user and/or user's host. SSD 10 may advertise the capability to store N bytes of data to the host, but in actuality may be capable of storing M bytes of data where M>N. When SSD 10 can store more than N bytes of data, SSD 10 is said to be over-provisioned. The value N represents an advertised amount of total storage in SSD 10. Controller 12 may use the degree to which SSD 10 is over-provisioned to determine whether to utilize spanning for an LBA. In particular, when SSD 10 is over-provisioned by less than a certain percentage, e.g. 10% (for example, $((M-N)/N)<0.1$), controller 12 may determine that spanning is important to more efficiently store data in SSD 10. Likewise, if controller 12 determines that an over-provisioning value is greater than an over-provisioning threshold, controller 12 may determine not to perform spanning, or determine that this factor in the spanning decision weighs against performing spanning. In some examples, the comparison of the over-provisioning value to the over-provisioning threshold may comprise one factor in a multi-factor analysis as to whether or not to perform spanning.

Controller 12 may also compare current power consumption with a power consumption metric, such as a maximum peak power consumption or windowed-average power consumption, and use the results of this comparison as another factor in the decision as to whether or not to perform spanning. Controller 12 may be configured with a desired average power consumption and determine how utilizing spanning for a particular LBA will affect the average power consumption. This may be especially important when the host storing data to SSD 10 is battery-powered, such as a laptop, cellular phone or smart phone, personal digital assistant, still image or video camera, mp3 player, or other battery-powered device. Controller 12 may accordingly determine how spanning will affect power consumption and utilize this determination as a factor influencing whether or not to utilize spanning.

Controller 12 may further be configured with a power consumption threshold. Controller 12 may measure power consumption by SSD 10 both when spanning is and is not applied and empirically determine how spanning impacts power consumption. Controller 12 may then further use this analysis as a factor in determining whether to perform spanning. In some examples, when controller 12 determines that spanning improves power consumption and determines that the power consumption value exceeds the power consumption threshold, controller 12 determines that spanning should be performed, but when the power consumption value does not exceed the power consumption threshold, spanning should not be performed. In some examples, controller 12 may use the determination of whether the power consumption value exceeds the power consumption threshold as one factor in a multi-factor analysis, e.g., in combination with any or all of the other factors discussed herein. To determine the power consumption value, controller 12 may measure power consumption, e.g., current wattage consumed by the solid state drive.

Controller 12 may also analyze the target lifespan of SSD 10 and use this analysis as another factor in the decision as to whether or not to perform spanning. In general, performing spanning will increase the lifespan of SSD 10, at the cost of increased processing power, by reducing the number of erasure cycles of erasure blocks that will be required to store data in SSD 10. Controller 12 may, for example, compare the number of erasure cycles that have been performed for SSD 10 to a rated number of erasure cycles, or compare a rate of erasures to a rated rate of erasure cycles. As one example, when the current rate of erasure cycles exceeds the rated rate of erasure cycles, controller 12 may be more likely to perform spanning, whereas when the current rate is less than the rated rate, controller 12 may be less likely to perform spanning to improve processing speed.

Another factor that controller 12 may analyze to determine whether to perform spanning is the likelihood that the LBA will be read in close temporal proximity with another LBA of the same page. When two LBAs are likely to be read in close temporal proximity, and one of the two LBAs will not fit on the same page as the other, when it comes time to read the two LBAs, two pages will need to be read to recover both of the LBAs, regardless of whether spanning is performed or not. However, when two LBAs are not likely to be read in close temporal proximity, reading a spanned LBA will require reading two pages, whereas reading either of the two LBAs individually without spanning would require reading only one page.

Therefore, when controller 12 determines, for an LBA for which a spanning decision is being made, that the LBA is likely to be read in close temporal proximity to another LBA of the same page, controller 12 may be more likely to perform spanning. Conversely, when the two LBAs are not likely to be read in close temporal proximity, controller 12 may be less likely to perform spanning. To determine whether two LBAs are likely to be read in close temporal proximity, controller 12 may determine whether two or more LBAs that are in sequence when written are commonly read in sequence later. When a sequentially written set of LBAs are also typically read in sequence, controller 12 may determine that a current LBA being written in sequence with other LBAs is likely to be read in sequence with the other LBAs as well.

Another factor in the determination of whether to perform spanning is a determined level of packing efficiency of LBAs in SSD 10. When controller 12 determines that SSD 10 has been "packed" with LBAs inefficiently up to the point of determining whether spanning should be performed, controller 12 may begin performing spanning to improve packing efficiency. On the other hand, when SSD 10 has been packed efficiently, controller 12 may determine that spanning is not necessary and instead to improve computational performance by not spanning. The level of packing efficiency may form a factor in the decision as to whether or not to perform spanning. In general, packing efficiency refers to the amount of space in one or more pages that is wasted, i.e., that is not filled with meaningful data. Meaningful data generally includes, for example, LBA data, page headers, ECCs, metadata for the page or one or more LBAs, or other such data that is explicitly written to the page or SSD 10 that is not padding.

Controller 12 may calculate a packing efficiency value according to how much meaningful data is explicitly written to SSD 10 relative to how much data the pages containing the meaningful data can potentially hold. For example, the packing efficiency value may comprise a percentage value of meaningful data that occupies pages to which data has been written. As an example, suppose 100,000 bytes of data have been written to 50 pages, and each page can store 2,200 bytes. In this example, controller 12 may calculate the packing efficiency value as (100,000/(50*2200))=90.9%. Controller 12 may also be configured with a packing efficiency threshold and be configured to perform a comparison of the packing efficiency value to the packing efficiency threshold as another factor in the analysis of whether to perform spanning.

As an example, assume that SSD 10 includes pages that hold 2048 bytes of data. Assume further that each LBA received from a host is 528 bytes. Absent spanning, only three LBAs will fit on a given page, for a total of 1575 bytes (four pages would occupy 2103 bytes). However, a fourth LBA will almost fit in the page. Therefore, controller 12 may determine to perform spanning in such a situation to improve packing efficiency, because without spanning, nearly one-fourth of the SSD would not be used.

In some examples, controller 12 may periodically determine whether or not to utilize spanning. For example, controller 12 may, upon determining to utilize spanning, consistently utilize spanning for each page as each page is written into SSD 10. Controller 12 may then reevaluate this determination periodically, and upon determining not to utilize spanning, consistently not utilizing spanning for each page. In other examples, controller 12 may evaluate whether or not to utilize spanning for each page or each sequence of LBAs. In still other examples, controller 12 may make a global determination as to whether or not to utilize spanning based on certain factors, then analyze other factors for each LBA to determine whether to override the global determination. In this manner, controller 12 may utilize the global determination as a default determination and the LBA- or page- or sequence-specific determination to override the global determination. For example, controller 12 may make a global spanning decision based on randomness of the host's write/read workload and a sequence-specific determination based on randomness of data in a particular sequence.

In some examples, controller 12 may further analyze different types of spanning and make a determination as to whether or not to perform spanning based on the type of spanning to be performed. For example, controller 12 may determine that performing spanning to a page immediately following a current page is more preferable than spanning to a page of a different erasure block or of a different flash die. Therefore, controller 12 may evaluate any or all of the above factors using a plurality of thresholds, where each threshold corresponds to a different type of spanning. Different example types of spanning include (i) spanning to an immediately subsequent page, (ii) spanning to another page of the same erasure block, and (iii) spanning to a page on a different erasure block of the same flash die Controller 12 may, in some examples, be configured with threshold values for any or all of the different types of spanning.

For example, with respect to the data randomness value, controller 12 may compare the data randomness value to a first data randomness threshold corresponding to spanning to an immediately subsequent page and a second data randomness threshold corresponding to spanning to a page of a different erasure block. When the data randomness value is below both the first and second thresholds, controller 12 determines not to perform spanning. When the data randomness value is less than the second threshold, but not the first threshold, controller 12 may perform spanning to an immediately subsequent page, but not a page of a different erasure block. When the data randomness value is above the first and second thresholds, controller 12 may perform spanning even to a page of a different erasure block.

Figure 2:
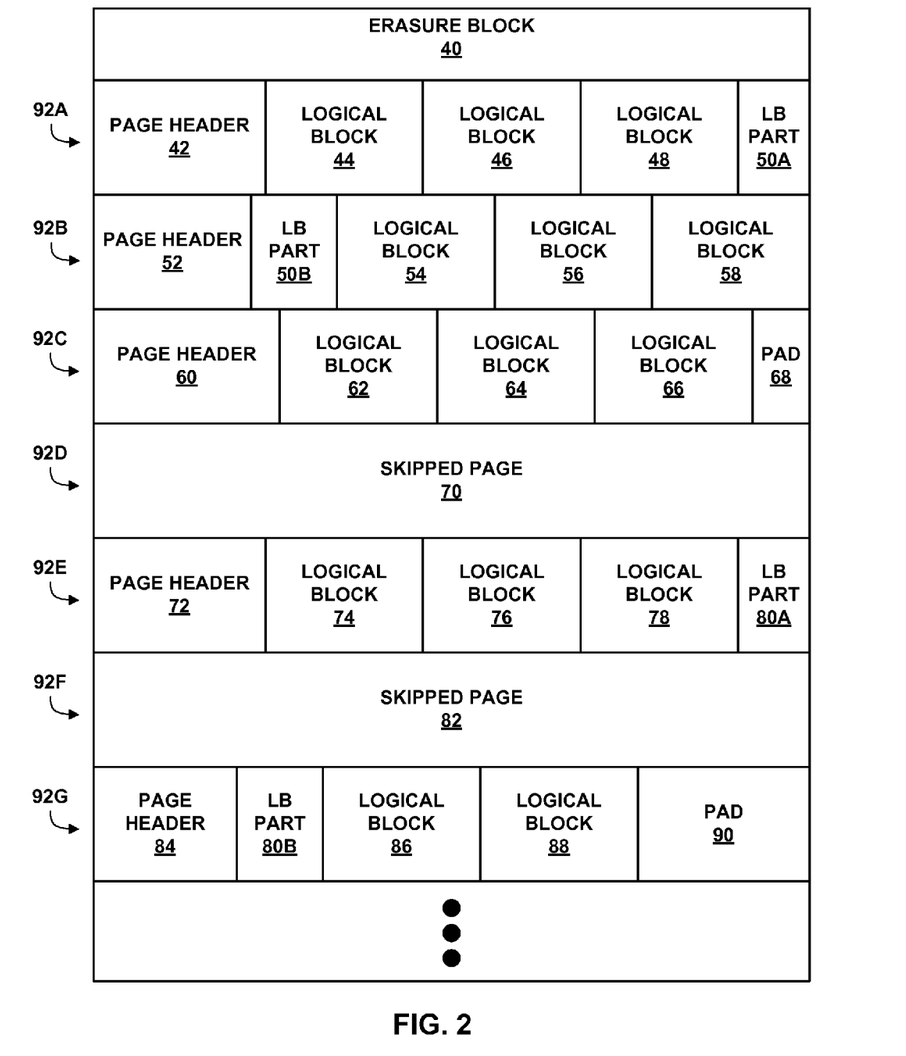
FIG. 2 is a block diagram illustrating an example erasure block of an SSD.

FIG. 2 is a block diagram illustrating an example erasure block 40. Erasure block 40 may correspond to one of erasure blocks 24 (FIG. 1). Each of erasure blocks 24 may include a structure similar to erasure block 40. In the example of FIG. 2, erasure block 40 comprises a plurality of pages 92A-92G (pages 92). Although seven pages are shown in FIG. 2, it should be understood that an erasure block may comprise any number of pages. Each of logical blocks 44-88 may include data received from a host computing device.

Each of pages 92 generally includes a header portion and a stored data portion. Page 92A, for example, includes page header 42 and logical blocks 44-48. Page 92B includes page header 52 and logical blocks 54-58, page 92C includes page header 60 and logical blocks 62-66, page 92E includes page header 72 and logical blocks 74-78, and page 92G includes page header 84 and logical blocks 86-88. Page 92A also includes logical block (LB) part 50A, which corresponds to a first portion of a complete logical block. Page 92B includes a logical block part 50B, which corresponds to a second, remaining portion of the complete logical block. In this manner, logical block parts 50A and 50B represents a logical block that spans between page 92A and page 92B. A logical block that spans between two or more pages may also be referred to as a spillover logical block, spillover LBA, bridging logical block, or bridging LBA. The logical block comprising the union of logical block parts 50A and 50B represents a logical block for which an SSD controller, such as controller 12 (FIG. 1) determined spanning was appropriate.

In some examples, controller 12 may also write a location identifier to page header 42 that identifies the location of logical block part 50B corresponding to logical block part 50A. In some examples, controller 12 also writes a location identifier to page header 52 of page 92B that indicates the "parent" page for logical block part 50B. Accordingly, when a page includes both a second, remaining portion of a logical block at the beginning of the page and a first portion of a logical block at the end of the page, a page header corresponding to the page may include two location identifiers, one to identify a previous page from which spanning occurred, and another to identify a next page to which a spanning logical block will be written. In some examples, controller 12 writes a location identifier in page headers of each of pages 92 that include a first portion of a spanning logical block, e.g., pages 92A and 92E in the example of FIG. 2.

Page 92C, on the other hand, includes logical blocks 62-66 and padding (pad) 68. Padding 68 represents a portion of page 92C that is unused, e.g., includes data unrelated to a particular logical block. In some examples, controller 12 explicitly writes zeros to padding 68. In other examples, controller 12 leaves any data currently in the bits corresponding to padding 68. Accordingly, page 92C represents a page for which controller 12 determined not to utilize spanning. In some examples, padding area 68 may instead be used as an error correction code (ECC). Further details regarding the use of extra space for an ECC are discussed in U.S. Pat. No. 8,140, 744, the entire contents of which are incorporated by reference in their entirety.

Controller 12 may skip some pages, such as skipped pages 70 and 82 (pages 92D, 92F), for various reasons. For example, data may already exist in these pages or the pages may be unwriteable due to an error. In the example of FIG. 2, page 92E includes logical block part 80A, which spans (as logical block part 80B) to page 92G, which is not the immediately next available page (that is, page 92F). Accordingly, in some examples, controller 12 may write a variable length code as a location identifier in page header 72 that identifies page 92F as the page containing logical block part 80B.

In this manner, erasure block 40 represents an erasure block of an SSD, such as SSD 10 (FIG. 1) for which spanning has been enabled in at least some pages. That is, erasure block 40 includes pages, such as page 92A, that store a plurality of logical blocks, wherein a size of the plurality of logical blocks exceeds a size of page 92A, so a first partition of one of the plurality of logical blocks is stored in page 92A, and a second partition of the one of the plurality of logical blocks is stored in a second, different page (e.g., page 92B). In other examples, a second partition of a logical block may be stored in a page of a different erasure block or even a different flash die.

Figure 3:
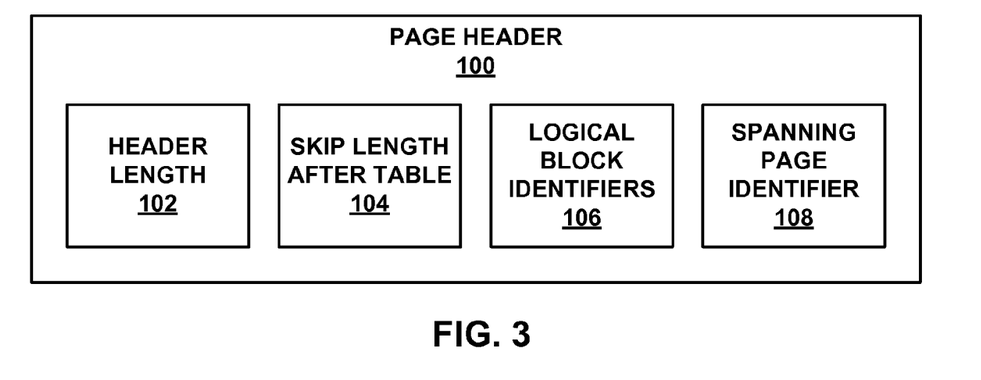
FIG. 3 is a block diagram illustrating an example page header for a page of an erasure block.

FIG. 3 is a block diagram illustrating an example page header 100 that may correspond to any of page headers 42, 52, 60, 72, or 84 (FIG. 2). Page header 100 includes header length value 102, skip length after table value 104, LBA identifiers 106, and spanning page identifier 108. Header length value 102 describes the length of page header 100, e.g., in bytes.

Controller 12 may use header length value 102, along with the value of skip length after table value 104 as described below, to determine where in a corresponding page LBA data begins.

Skip length after table value 104 generally describes the length of any portion of a spanning LBA in the page corresponding to page header 100. In this manner, controller 12 may identify the starting point of an LBA unique to the page corresponding to page header 100 by adding the values of header length 102 and skip length after table 104. In the example of FIG. 2, with respect to page 92B, header length value 102 would describe the length of page header 52, and skip length after table value 104 would describe the length of LBA portion 50B. Accordingly, controller 12 could add the values of header length value 102 and skip length after table value 104 to identify the starting point of LBA 54, with respect to the example of page 92B. When no spanning LBA portion is present in the corresponding page, controller 12 may set the value of skip length after table 104 to zero.

LBA identifiers 106 generally describe the LBAs that are present in the page corresponding to page header 100. In some examples, when an LBA of the page spans to another page, LBA identifiers 106 will include an identifier for the LBA. In some examples, when a portion of an LBA in the page spans from another page, LBA identifiers 106 will not include an identifier for the spanning LBA. With respect to FIG. 2, for example, page header 42 may include LBA identifiers for LBAs 44, 46, 48, and 50, while page header 52 may include LBA identifiers for LBAs 54, 56, and 58 (but not 50). In other examples, LBA identifiers 106 may include identifiers for any LBA or LBA portion occurring in the page corresponding to page header 100, even when the LBA portion spans from another page. In still other examples, LBA identifiers 106 may include a predetermined value, such as the value "not-a-number" (NaN), that represents the presence of a remaining portion of a spanning LBA in the page corresponding to page header 100.

Spanning page identifier 108 generally includes a value indicating whether the page corresponding to page header 100 spans and, when it does, the page to which data spans. In some examples, controller 12 utilizes a variable length code to represent the data for spanning page identifier 108. In one example, controller 12 uses a single bit value of "0" for spanning page identifier 108 to represent that no spanning occurs for the page corresponding to page header 100, a two-bit value "10" to represent that spanning occurs for the page corresponding to page header 100, and that the page to which data spans is the page immediately following the page corresponding to page header 100, and a two-bit value "11" to represent that spanning occurs for the page corresponding to page header 100, plus an additional identifier of the page to which the data spans.

In some examples, the identifier of the page to which the data spans may comprise an additional variable length code. A first bit of the variable length code may represent whether the spanning page is on the same flash die, and a second bit may represent whether the spanning page is on the same erasure block when the first bit indicates that the spanning page is on the same flash die. When the spanning page is not on the same flash die, the second bit may not be included. Following these bits, controller 12 may explicitly define the location of the spanning page. Table 1 below summarizes these example variable length codes:

TABLE 1

| Variable Length Code | Meaning |
| --- | --- |
| 0 | No spanning |
| 10 | Spanning to next page |
| 1111 + page_identifier | Spanning to page identified by page_identifier on same flash die and same erasure block |
| 1110 + erasure_block_identifier + page_identifier | Spanning to page identified by page_identifier of erasure block identified by erasure_block_identifier of same flash die |
| 110 + flash_die_identifier + erasure_block_identifier + page_identifier | Spanning to page identified by page_identifier of erasure block identified by erasure_block_identifier of flash die identified by flash_die_identifier |

The values page_identifier, erasure_block_identifier, and flash_die_identifier in Table 1 are bit vectors that identify, respectively, a page, an erasure block, and a flash die. Assuming that there are a maximum of L pages per erasure block, a maximum of M erasure blocks per flash die, and a maximum of N flash dies, page_identifier may be represented by a $\log_2(L)$ bit vector, erasure_block_identifier may be represented by a $\log_2(M)$ bit vector, and flash_die_identifier may be represented by a $\log_2(N)$ bit vector.

Figure 4:
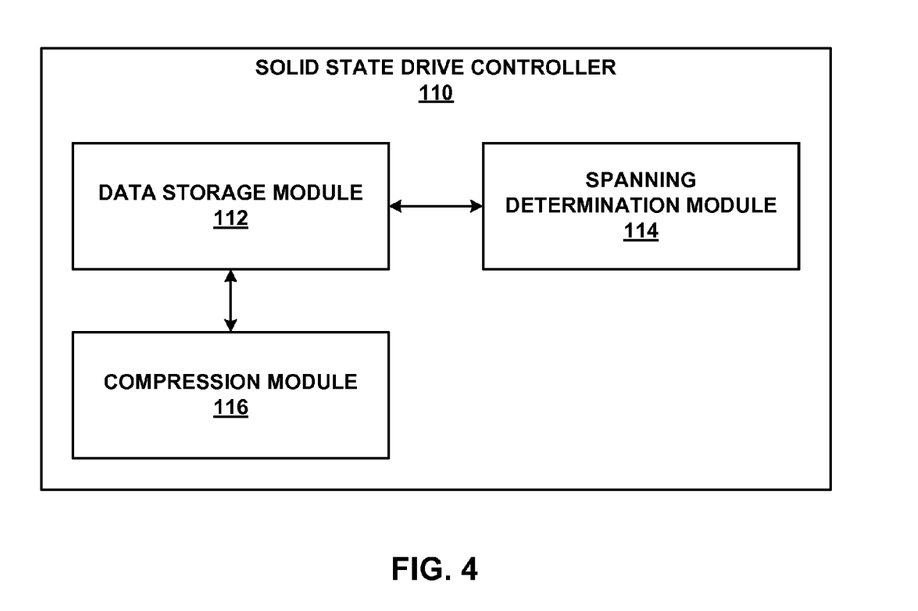
FIG. 4 is a block diagram illustrating components of an example SSD controller.

FIG. 4 is a block diagram illustrating an example SSD controller 110. In the example of FIG. 4, SSD controller 110 includes compression module 112, spanning determination module 114, and data storage module 112. SSD controller 110 may additionally comprise one or more processors (not shown) that execute compression module 112, spanning determination module 114, and data storage module 112. Compression module 112, spanning determination module 114, and data storage module 112 may each correspond to hardware, software, firmware, or any combination thereof. For example, each of compression module 112, spanning determination module 114, and data storage module 112 may comprise independent hardware units, independent software modules executed by a programmable processor, or independent software modules executed by distinct processors.

Figure 6:
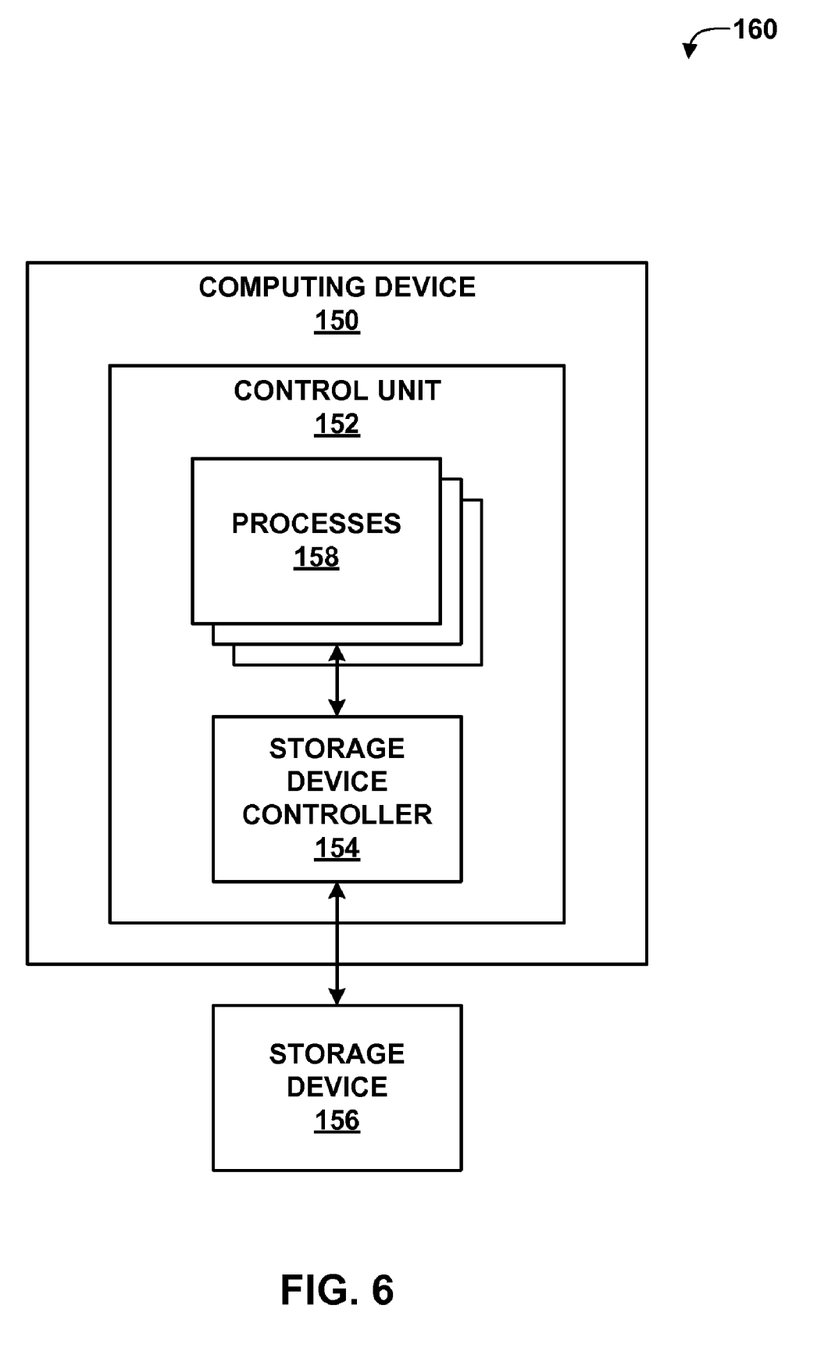
FIG. 6 is a block diagram illustrating an example system in which a computing device is coupled to an SSD that is controlled by a control unit separate from the SSD.

SSD controller 110 may correspond to controller 12 (FIG. 1). That is, SSD controller 110 may comprise a controller that forms part of the SSD being controlled. Alternatively, e.g., as shown in FIG. 6 below, SSD controller 110 may be executed by a device distinct from the SSD being controlled by SSD controller 110. For example, a computing device may execute SSD controller 110 as a software driver to control the SSD corresponding to SSD controller 110.

Data storage module 112 generally receives and stores data to the SSD corresponding to SSD controller 110. Data storage module 112 may receive data from a host device, such as a computing device, to be stored in long-term storage of the corresponding SSD. Data storage module 112 may also receive a request for stored data from the host device, and in response to the request, may retrieve the stored data from the corresponding SSD and return the retrieved data to the host device.

Spanning determination module 114 analyzes one or more factors to determine whether to enable spanning for one or more LBAs. In one example, data storage module 112 queries spanning determination module 114 with a particular LBA or sequence of LBAs to determine whether to perform spanning when storing the LBAs. In another example, spanning determination module 114 periodically evaluates various criteria and may set, for example, a global variable (not shown) accessible by data storage module 112 to indicate whether to perform spanning. In another example, spanning determination module 114 indicates a default spanning determination and analyzes individual LBAs to determine whether to override the default determination based on the analysis of the individual LBAs.

Spanning determination module 114 may analyze various criteria to determine whether to perform spanning. For example, spanning determination module 114 may analyze sequentiality of blocks in a page, current over-provisioning of the system, efficiency of storage in a page, current power consumption (e.g., relative to maximum peak power), comparison of proximity of blocks if spanning is applied, current packing efficiency of in-use physical blocks (e.g., level of currently used pages relative to number of total pages), or number of rated erasure cycles compared with actual erasure cycles, as described above.

Compression module 116 compresses LBAs to be stored by data storage module 112 in the corresponding SSD. Compression module 116 may utilize any method as is known in the art for compressing the LBAs, including entropy encoding algorithms, lossless encoding algorithms, variable-length coding algorithms, or other such encoding algorithms. For example, compression module 116 may compress LBAs using Huffman coding, Adaptive Huffman coding, arithmetic coding, Golomb coding, Exponential-Golomb coding, Elias gamma coding, Fibonacci coding, context tree weighting coding, Burrows-Wheeler transform, Prediction by Partial Matching, Dynamic Markov compression, run-length encoding, DEFLATE, or other coding/compression algorithms. Compression module 116 also decodes encoded LBAs before data storage module 112 returns LBAs to the host computing device in response to a request from the host computing device. Depending upon the compression algorithm applied, compression module 116 may maintain one or more data structures to perform encoding and/or decoding, such as a dictionary table that maps codewords to corresponding complete values.

In one example, in which an SSD comprises SSD controller 110, the SSD includes a flash die comprising an erasure block, wherein the erasure block comprises a first page to store logical blocks of data, a data storage module to receive data to be stored, wherein the data comprises a plurality of logical blocks, and wherein a size of the plurality of logical blocks exceeds a size of the first page, and a spanning determination module to determine whether to partition one of the plurality of logical blocks into a first partition and a second partition, wherein the data storage module is configured to partition the one of the plurality of logical blocks into the first partition and the second partition and to store the first partition in the first page and the second partition in a second, different page when the spanning determination module determines to partition the one of the plurality of logical blocks.

Figure 5:
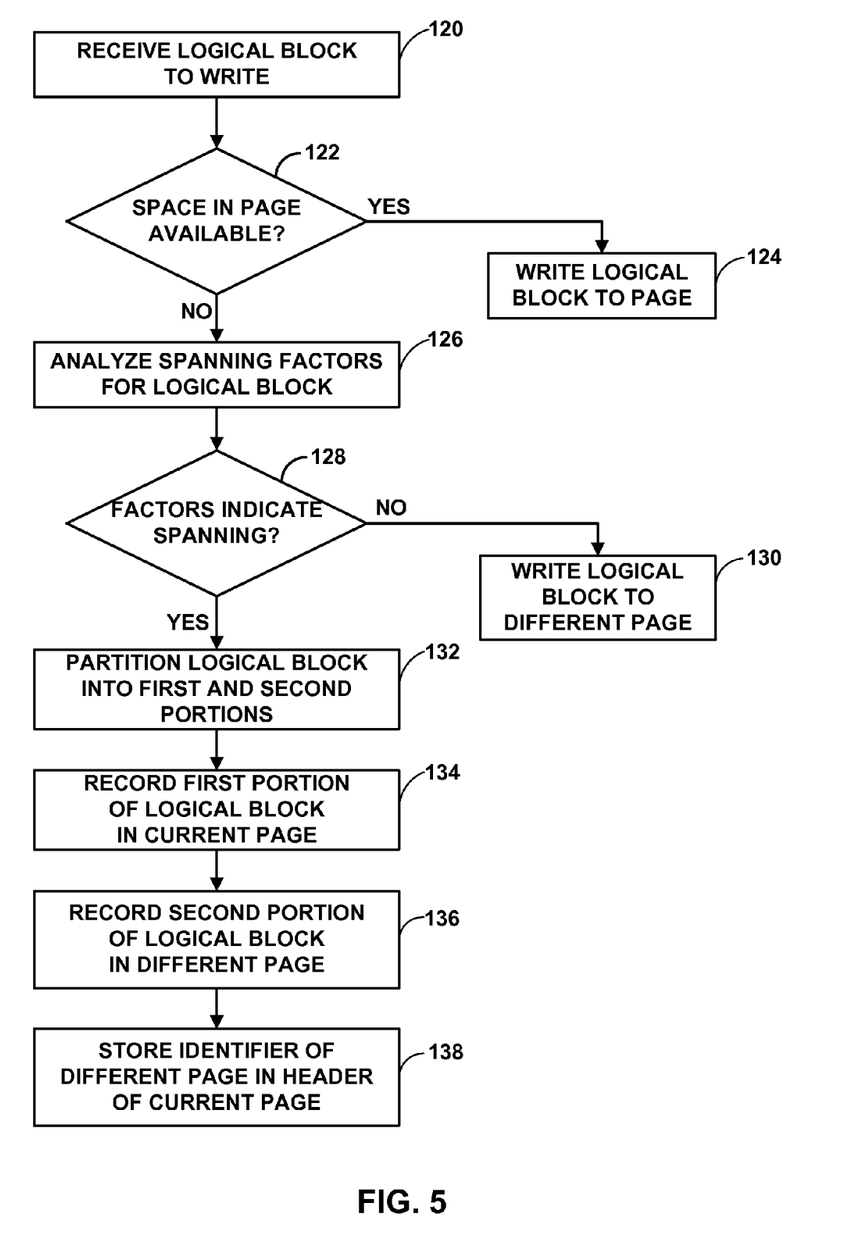
FIG. 5 is a flowchart illustrating an example method for determining whether to utilize spanning when writing logical blocks to a page of an SSD.

FIG. 5 is a flowchart illustrating an example method for determining whether to utilize spanning when writing LBAs to a page of an SSD. The method of FIG. 5 is described for illustrative purposes with respect to SSD controller 110 (FIG. 4). However, other devices may perform the method of FIG. 5 in other examples. In general, the method of FIG. 5 may be performed by an SSD controller either incorporated into an SSD or external to an SSD, such as by an SSD driver executed by a computing device. In one example, the method of FIG. 5 includes receiving, by a solid state drive, data to store in the solid state drive, wherein the data comprises a plurality of logical blocks, and wherein a size of the plurality of logical blocks exceeds a size of a first page of an erasure block of the solid state drive, determining to partition one of the plurality of logical blocks into a first partition and a second partition, partitioning the one of the plurality of logical blocks into the first partition and the second partition, and storing the first partition in the first page and the second partition in a second, different page of the solid state drive.

Initially, data storage module 112 receives a logical block to write (120). That is, data storage module 112 receives a logical block to be stored to a corresponding SSD. Data storage module 112 then determines whether there is enough space in the page to write the received logical block (122). When there is enough space available in the page ("YES" branch of 122), data storage module 112 writes the logical block to the page (124). In particular, data storage module 112 writes the logical block to volatile memory 14 (FIG. 1) in the form of a page to be written to non-volatile memory 20 (FIG. 1).

When there is not enough space in the page ("NO" branch of 122), data storage module 112 queries spanning determination module 114 with the received logical block, and spanning determination module 114 analyzes factors regarding the logical block to determine whether or not to perform spanning using the received logical block (126), in the example of FIG. 5. In other examples, data storage module 112 may look up the value of a global variable regarding whether to perform spanning, and spanning determination module 114 may periodically update the value of the global variable independently of data storage module 112 having received data to be stored.

In the example of FIG. 5, spanning determination module 114 determines whether the analysis of the factors with respect to the received logical block indicate that spanning should be performed for the logical block (128). When the factors indicate not to perform spanning ("NO" branch of 128), spanning determination module 114 sends a signal to data storage module 112 not to perform spanning. In response, data storage module 112 writes the logical block entirely to a different page than the current page (130). In particular, data storage module 112 constructs a page header for the page being assembled in volatile memory 14 and writes the page to non-volatile memory 20.

However, when spanning determination module 114 determines that the analyzed factors indicate that spanning should be performed ("YES" branch of 128), spanning determination module 114 sends a signal or command to data storage module 112 to utilize spanning when storing the logical block. In response, data storage module 112 partitions the received logical block into a first partition and a second partition (132). Data storage module 112 constructs the first partition such that the data to be written into the page, including the first partition and a corresponding page header, will fit onto a single page (134). Data storage module 112 writes the second partition into a second, different page (136). Data storage module 112 also records an identifier of the second, different page (in which the second partition of the logical block is written) in the page header of the page including the first partition (138). Data storage module 112 may then write the page including the first partition of the logical block from volatile memory 14 into non-volatile memory 20.

As an example, spanning determination module 114 may be configured to execute an algorithm similar to the following pseudocode to determine whether to perform spanning. In general, the pseudocode analyses various factors and produces a binary result from the analysis of the factors. A value of "true" indicates that spanning should be performed, while a value of "false" indicates that spanning should not be performed. The pseudocode presented below is one example implementation of a method for determining whether to perform spanning for a particular block when that block could potentially be spanned when stored in a particular page. In particular, the following pseudocode determines a score for whether to span a block, referred to as "currentBlock," for page "currentPage," and when the score is greater than a threshold value, "0.5" in the example pseudocode, returns a value of "true," indicating that spanning should be performed. In the example, spanning across erasure blocks (EBs) is not permitted, as indicated by the statements "if (SSD.nextLocation.EbNumber!=SSD.currentLocation.EbNumber) return FALSE." However, in other examples, spanning across erasure blocks may be enabled by removing these statements.

The "return" statement takes into consideration various factors discussed above, such as an over provisioning value "overProvisioning," a weighting value to apply to the over provisioning value "weightOfOverprovisioning," a value representative of efficiency of data storage in a page "pageEfficiency," a weighting value for the page efficiency value "weightOfPageEfficiency," a value representative of power consumption "powerConsumption," a weighting value for the power consumption "weightOfPowerConsumption," differential packing efficiency, which comprises a difference between packing efficiency and page efficiency and a corresponding weighting value "weightOfDifferentialPackingEfficiency," a comparison of packing efficiency to page efficiency, a value representative of a number of erasure cycles compared to an average number of erasure cycles for the specified lifetime of a device "lifetimeAcceleration," and a corresponding weighting value "weightOfLifetimeAcceleration."

These values are combined in the "return" statement to determine whether the result is greater than the threshold value of "0.5" in this example. Other examples may adjust the threshold value to influence the behavior in favor of or against spanning.

```
bool performSpanning(int currentBlock, int currentPage) {
    float overProvisioning = SSD.overProvisioning( ); // in [0,1]
    float pageEfficiency = SSD.pageFill(currentPage) / SSD.pageSize( );
    float powerConsumption = SSD.power( ) / SSD.maxPower( );
    float packingEfficiency = SSD.hostBytesMapped( ) /
```

-continued

```
(SSD.pagesUsed( ) * SSD.pageSize( ));
    float threshold = .5;
    float lifetimeAcceleration = (SSD.currentErasureCycles( ) / SSD.timeUsed( )) /
        (SSD.specifiedLifetimeErasureCycles( ) / SSD.specifiedLifetime( ));
    if ((SSD.nextLocation.EbNumber != SSD.currentLocation.EbNumber) {
        return FALSE; // choose to not allow spanning across EBs
    }
    else {
        return((
                ((1.0-overProvisioning) * weightOfOverprovisioning) +
                (power(1.0-overProvisioning,2) *
                weightOfOverprovisioningSq) + ((1.0-pageEfficiency) *
                weightOfPageEfficiency) +
                (power(1.0-pageEfficiency,2) * weightOfPageEfficiencySq) +
                ((powerConsumption) * weightOfPowerConsumption) +
                (power(powerConsumption,2) *
                weightOfPowerConsumptionSq) + ((packingEfficiency-
                pageEfficiency)* WeightOfDifferentialPackingEfficiency)
                + ( ( (packingEfficiency < pageEfficiency) ?0:
                power(packingEfficiency-pageEfficiency,2) ) *
                WeightOfDifferentialPackingEfficiencySq ) +
                ((lifetimeAcceleration) * weightOfLifetimeAcceleration) +
                (power(lifetimeAcceleration,2)*weightOfLifetimeAcceleration
                Sq)) > threshold);
    }
}
```

FIG. 6 is a block diagram illustrating an example system 160 in which a computing device 150 is coupled to storage device 156 that is controlled by a control unit 154 separate from storage device 156. Storage device 156 may comprise, for example, a solid state drive (SSD), a flash drive, a disk drive, or any other partitionable or partitioned storage medium. Although primarily described with respect to SSDs for purposes of example and explanation, it should be understood that the techniques of this disclosure may also be applied to any partitioned storage medium, e.g., any block access storage device. In the example of FIG. 6, computing device 150 includes control unit 152, which generally comprises hardware for executing processes 158 and storage device controller 154. Storage device controller 154 may correspond to SSD controller 110 (FIG. 4) in one example. In the example of FIG. 6, storage device controller 154 may correspond to software and/or firmware executed by control unit 152. For example, control unit 152 may execute an operating system, which includes storage device controller 154 as a driver to control storage device 156.

Control unit 152 may include hardware, software, firmware, or any combination thereof. For example, control unit 152 may comprise one or more processors, such as microprocessors, digital signal processors (DSPs), application specific integrated circuits (ASICs), field programmable gate arrays (FPGAs), or any other equivalent integrated or discrete logic circuitry, as well as any combinations of such components.

Processes 158 generally include one or more computing processes executed by control unit 150. Processes 158 interact with storage device controller 154 to store and/or retrieve data to/from storage device 156. Processes 158 may include, for example, office software such as a word processor or spreadsheet program, interactive media such as a music player, video player, or video game, Internet software such as an e-mail client or web browser, or any other processes performed on computing device 150.

Storage device controller 154 may receive requests from one or more of processes 158 to retrieve and/or store data to storage device 156. Storage device controller 154 may further perform the techniques of this disclosure to enable spanning between pages of storage device 156. In this manner, FIG. 6 represents one example of a system including a solid state drive comprising a flash die, wherein the flash die comprises an erasure block, wherein the erasure block comprises a first page to store logical blocks of data, and a computing device coupled to the solid state drive, the computing device comprising a computer-readable medium to store instructions for a data storage module and a spanning determination module, and a control unit to execute the data storage module and the spanning determination module, wherein the control unit executes the data storage module to receive data to be stored to the solid state drive, wherein the data comprises a plurality of logical blocks, wherein at least one of the plurality of logical blocks does not match a size of a corresponding physical block, and wherein a size of the plurality of logical blocks exceeds a size of the first page, wherein the control unit executes the spanning determination module to determine whether to partition one of the plurality of logical blocks into a first partition and a second partition, and wherein the control unit executes the data storage module to partition the one of the plurality of logical blocks into the first partition and the second partition and to store the first partition in the first page and the second partition in a second, different page when the spanning determination module determines to partition the one of the plurality of logical blocks.

Although described primarily with respect to solid state drives and solid state storage media, it should be understood that the techniques of this disclosure may also apply to other block based storage media. For example, the techniques of this disclosure may also be used to enable spanning among pages of magnetic storage media, such as a hard disk, or optical storage media, such a CD-ROM.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The techniques of this disclosure are also related to techniques described in copending U.S. Publication No. 2011/0099350, assigned to the assignee of this application, which is hereby incorporated by reference in its entirety.

Various examples have been described. These and other examples are within the scope of the following claims.

The invention claimed is:

1. A method comprising:
receiving, by a storage device, data to store in the storage device, the data comprising a plurality of logical blocks at least one of which does not match a corresponding physical block size of the storage device;
determining that a size of the plurality of logical blocks exceeds a size of a first page of an erasure block of the storage device;
determining whether to span at least one of the plurality of logical blocks across the first page and a second, different page of the storage device;
responsive to determining to span the at least one of the plurality of logical blocks, partitioning the one of the plurality of logical blocks into a first partition and a second partition, and storing the first partition in the first page and the second partition in the second page; and
responsive to determining not to span the at least one of the plurality of logical blocks, storing the at least one of the plurality of logical blocks in a page of the storage device other than the first page.

2. The method of claim 1, further comprising storing a page header in the first page, wherein the page header identifies a location in the storage device of the second, different page.

3. The method of claim 2, wherein storing the page header comprises storing a variable-length representation of the location of the second, different page in the page header.

4. The method of claim 2, wherein the page header defines the location as one of an identifier indicating that the second, different page comprises an immediately subsequent page or an identifier that explicitly defines the location of the second, different page.

5. The method of claim 2, further comprising storing in the page header a length value representative of a length of the page header.

6. The method of claim 2, further comprising storing in the page header a plurality of logical block identifiers each identifying different ones of the plurality of logical blocks stored in the first page.

7. The method of claim 1, further comprising storing a page header in the second, different page, wherein the page header defines a size of the second partition.

8. The method of claim 7, wherein storing the page header comprises defining in the page header a location in the storage device of the first page.

9. The method of claim 1, wherein determining to partition comprises determining that the plurality of logical blocks, absent the one of the plurality of logical blocks, does not exceed a threshold number of bytes to be stored in the first page.

10. The method of claim 1, wherein receiving comprises receiving the data from a host, and wherein determining to partition comprises determining that a sequentiality value, corresponding to sequentiality of the plurality of logical blocks, exceeds a sequentiality threshold value.

11. The method of claim 1, wherein determining to partition comprises:
analyzing the received data to determine a compressibility value for the received data corresponding to an amount of compression that can be achieved for the data; and
determining that the compressibility value is less than a compressibility threshold value.

12. The method of claim 1, wherein determining to partition comprises determining that an over-provisioning value for the storage device does not exceed an over-provisioning threshold value, wherein the over-provisioning value corresponds to an amount of data stored in the storage device in excess of a host capacity of the storage device.

13. The method of claim 1, wherein determining to partition comprises determining that a power consumption value for the storage device exceeds a power consumption threshold value, wherein the power consumption value for the storage device corresponds to an amount of power being consumed by the storage device.

14. The method of claim 1, wherein determining to partition comprises determining that a packing efficiency value does not exceed a packing efficiency threshold, wherein the packing efficiency value corresponds to an amount of space in the storage device in written pages that does not include meaningful data.

15. A storage device comprising:
a flash die comprising an erasure block, wherein the erasure block comprises a first page to store logical blocks of data;
a data storage module to receive data to be stored, wherein the data comprises a plurality of logical blocks, wherein at least one of the plurality of logical blocks does not match a size of a corresponding physical block of the first page, and wherein a size of the plurality of logical blocks exceeds a size of the first page; and
a spanning determination module to determine whether to partition one of the plurality of logical blocks into a first partition and a second partition,
wherein the data storage module is configured to partition the one of the plurality of logical blocks into the first partition and the second partition and to store the first partition in the first page and the second partition in a second, different page when the spanning determination module determines to partition the one of the plurality of logical blocks.

16. The storage device of claim 15, wherein the data storage module is configured to store a page header in the first page, wherein the page header identifies a location in the storage device of the second, different page using a variable-length representation of the location of the second, different page, and wherein the page header identifies each of the plurality of logical blocks stored in the first page.

17. The storage device of claim 15, wherein the data storage module is configured to store a page header in the second, different page, wherein the page header defines a size of the second partition and a location of the first page in the storage device.

18. The storage device of claim 15, wherein the spanning determination module is configured to determine to partition the one of the plurality of logical blocks when the spanning determination module determines that a sequentiality value, corresponding to sequentiality of the plurality of logical blocks, exceeds a sequentiality threshold.

19. The storage device of claim 15, wherein the spanning determination module is configured to determine to partition the one of the plurality of logical blocks when the spanning determination module determines that a compressibility value for the received data corresponding to an amount of compression that can be achieved for the received data exceeds a compressibility value.

20. The storage device of claim 15, wherein the spanning determination module is configured to determine to partition the one of the plurality of logical blocks when the spanning determination module determines that an over-provisioning value for the storage device does not exceed an over-provisioning threshold value, wherein the over-provisioning value corresponds to an amount of data stored in the storage device in excess of a host capacity of the storage device.

21. The storage device of claim 15, wherein the spanning determination module is configured to determine to partition the one of the plurality of logical blocks when the spanning determination module determines that a power consumption value for the storage device exceeds a power consumption threshold value.

22. The storage device of claim 15, wherein the spanning determination module is configured to determine to partition the one of the plurality of logical blocks when the spanning determination module determines that a packing efficiency value does not exceed a packing efficiency threshold, wherein the packing efficiency value corresponds to an amount of space in the storage device in written pages that does not include meaningful data.

23. A system comprising:
a storage device comprising a flash die, wherein the flash die comprises an erasure block, wherein the erasure block comprises a first page to store logical blocks of data; and
a computing device coupled to the storage device, the computing device comprising:
a computer-readable medium to store instructions for a data storage module and a spanning determination module; and
a control unit to execute the data storage module and the spanning determination module,
wherein the control unit executes the data storage module to receive data to be stored to the storage device, wherein the data comprises a plurality of logical blocks, wherein at least one of the plurality of logical blocks does not match a size of a corresponding physical block of the first page, and wherein a size of the plurality of logical blocks exceeds a size of the first page, wherein the control unit executes the spanning determination module to determine whether to partition one of the plurality of logical blocks into a first partition and a second partition, and wherein the control unit executes the data storage module to partition the one of the plurality of logical blocks into the first partition and the second partition and to store the first partition in the first page and the second partition in a second, different page when the spanning determination module determines to partition the one of the plurality of logical blocks.

24. The system of claim 23, wherein the data storage module is configured to store a page header in the first page, wherein the page header identifies a location in the storage device of the second, different page using a variable-length representation of the location of the second, different page, and wherein the page header identifies each of the plurality of logical blocks stored in the first page.

25. The system of claim 23, wherein the data storage module is configured to store a page header in the second, different page, wherein the page header defines a size of the second partition and identifies a location of the first page in the storage device.

26. The system of claim 23, wherein the spanning determination module is configured to determine to partition the one of the plurality of logical blocks when the spanning determination module determines that at least one of a sequentiality value, corresponding to sequentiality of the plurality of logical blocks, exceeds a sequentiality threshold, a compressibility value for the received data corresponding to an amount of compression that can be achieved for the received data exceeds a compressibility value, an over-provisioning value for the storage device exceeds an over-provisioning threshold value, a power consumption value for the storage device exceeds a power consumption threshold value, and a packing efficiency value does not exceed a packing efficiency threshold, wherein the over-provisioning value corresponds to an amount of data stored in the storage device in excess of a host capacity of the storage device, and wherein the packing efficiency value corresponds to an amount of space in the storage device in written pages that does not include meaningful data.

27. A non-transitory computer-readable storage medium encoded with instructions for causing a programmable processor to:
receive data to store in a storage device, wherein the data comprises a plurality of logical blocks, wherein at least one of the plurality of logical blocks does not match a size of a corresponding physical block of the first page, and wherein a size of the plurality of logical blocks exceeds a size of a first page of an erasure block of the storage device;
determine to partition one of the plurality of logical blocks into a first partition and a second partition;
partition the one of the plurality of logical blocks into the first partition and the second partition; and
store the first partition in the first page and the second partition in a second, different page of the storage device.

* * * * *